United States Patent
Wieres et al.

(10) Patent No.: US 6,659,333 B2
(45) Date of Patent: Dec. 9, 2003

(54) METAL FOIL CONNECTION, HONEYCOMB BODY, METAL FOIL BRAZING MEDIUM PARTICLE FRACTION FOR METAL FOILS AND METHOD FOR MANUFACTURING A METAL FOIL CONNECTION

(75) Inventors: Ludwig Wieres, Overath (DE); Ferdi Kurth, Mechernich (DE); Helge Schlotmann, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 10/304,132

(22) Filed: Nov. 25, 2002

(65) Prior Publication Data

US 2003/0116610 A1 Jun. 26, 2003

Related U.S. Application Data

(63) Continuation of application No. 09/917,555, filed on Jul. 27, 2001, now abandoned, which is a continuation of application No. PCT/EP00/00140, filed on Jan. 11, 2000.

(30) Foreign Application Priority Data

Jan. 27, 1999 (DE) .......................................... 199 03 184

(51) Int. Cl.$^7$ .............................. B32B 3/02; B32B 3/12; B32B 15/01; B23K 35/12
(52) U.S. Cl. .................... 228/181; 228/248.1; 228/250; 428/593; 428/594; 428/553; 428/925
(58) Field of Search ............................. 228/181, 248.1, 228/250; 428/593, 594, 553, 925

(56) References Cited

U.S. PATENT DOCUMENTS

| | | | | |
|---|---|---|---|---|
| 4,752,599 A | * | 6/1988 | Nakamura et al. | .......... 502/257 |
| 5,045,403 A | | 9/1991 | Maus et al. | |
| 5,286,314 A | * | 2/1994 | Das et al. | .................... 148/528 |
| 5,332,455 A | * | 7/1994 | Chang et al. | ................ 148/440 |
| 5,431,330 A | | 7/1995 | Wieres | |
| 5,501,391 A | | 3/1996 | Wieres | |
| 5,648,176 A | | 7/1997 | Nakagawa et al. | |
| 6,199,749 B1 | | 3/2001 | Wieres et al. | |
| 6,240,640 B1 | * | 6/2001 | Matsuoka et al. | ....... 29/897.32 |
| 2001/0016266 A1 | | 8/2001 | Okazaki et al. | |

FOREIGN PATENT DOCUMENTS

| | | |
|---|---|---|
| DE | 42 19 145 C1 | 3/1994 |
| WO | WO 98/17431 | 4/1998 |

* cited by examiner

Primary Examiner—John J. Zimmerman
Assistant Examiner—Jason L Savage
(74) Attorney, Agent, or Firm—Laurence A. Greenberg; Werner H. Stemer; Ralph E. Locher

(57) ABSTRACT

A metal foil connection of first and second metal foils having a thickness of less than 0.05 mm includes a connecting point in which the metal foils are brazed to one another. The connecting point forms a wedge which is filled with brazing medium. A mass of the brazing medium, and a mass of sections of the metal foils which the brazing medium contacts in the wedge, have a given ratio. A honeycomb body, a brazing medium particle fraction and a method for manufacturing metal foil connections with a thickness of less than 50 micrometers, are also provided.

1 Claim, 5 Drawing Sheets

| DF [μm] | ML/DF [g/m] | | |
|---|---|---|---|
| | max. | min. | ideal |
| 10 | 27 | 16 | 20 |
| 20 | 16 | 9,2 | 12 |
| 25 | 14,8 | 9 | 11,2 |
| 30 | 14,6 | 8,6 | 11 |
| 40 | 14,5 | 8,7 | 11 |
| 50 | 14,8 | 8,8 | 11 |

METAL FOIL CONNECTION, HONEYCOMB BODY, METAL FOIL BRAZING MEDIUM PARTICLE FRACTION FOR METAL FOILS AND METHOD FOR MANUFACTURING A METAL FOIL CONNECTION

CROSS-REFERENCE TO RELATED APPLICATION

This application is a continuation of U.S. application Ser. No. 09/917,555, filed Jul. 27, 2001, now abandoned which was a continuation of copending International Application No. PCT/EP00/00140, filed Jan. 11, 2000, which designated the United States and which was not published in English.

BACKGROUND OF THE INVENTION

Field of the Invention

The present invention relates to a metal foil connection of a first and a second metal foil. The first and second metal foils each have a thickness of less than 0.05 mm, and are brazed to one another at a connecting point. The connecting point forms a wedge which is filled with brazing medium. The invention furthermore relates to a honeycomb body of sheet metal layers. The sheet metal layers are formed from metal foils which are at least partly structured and have a thickness of less than 0.05 mm. The sheet metal layers are at least partly brazed to one another. They have one or two respective wedges filled with brazing medium at the brazed connecting points. The invention also relates to a metal foil-brazing medium particle fraction for manufacturing a brazed connection, and a method for manufacturing a metal foil connection of the first and second metal foils through the use of a metal foil-brazing medium particle fraction.

Brazing methods and brazed connections, for example for a metallic honeycomb body, are state of the art for sheet metal layers. German Patent DE 42 19 145 C1, corresponding to U.S. Pat. No. 5,431,330, disclose immersing a honeycomb body in a fluidized bed of brazing powder. The pre-prepared honeycomb body forms brazing medium particles at desired points from a brazing medium particle fraction. The size of the brazing medium particles should be between 1 and 200 micrometers, preferably between 38 and 125 micrometers. Particle sizes in the lower half of that range are more frequently desired than in the upper half. Other methods for applying brazing medium are also disclosed in that document. The methods for applying brazing medium belonging to the prior art are used successfully in brazing honeycomb bodies having sheet metal layers which are made of metal sheets with a material thickness of at least 50 micrometers and more.

SUMMARY OF THE INVENTION

It is accordingly an object of the invention to provide a metal foil connection, a honeycomb body, a metal foil brazing medium particle fraction for metal foils and a method for manufacturing a metal foil connection, which overcome the hereinafore-mentioned disadvantages of the heretofore-known methods and devices of this general type and which provide a durable metal foil connection for thin metal foils with a thickness of less than 50 micrometers, in particular less than 40 micrometers.

With the foregoing and other objects in view there is provided, in accordance with the invention, a metal foil connection, comprising a first and a second metal foil having a thickness of less than 0.04 mm. The first and the second metal foils are brazed to one another at a connecting point forming a wedge. Brazing medium substantially fills the wedge and has a mass ML. The first and the second metal foils have sections contacted by the brazing medium in the wedge. The sections having a mass MF. The mass ML of the brazing medium and the mass MF of the sections of the metal foils contacted by the brazing medium in the wedge are in a given ratio MF/ML of between substantially 4 and substantially 8.

With the objects of the invention in view, there is also provided a metal foil connection, comprising a first and a second metal foil having a thickness DF of less than 0.04 mm. The first and the second metal foils are brazed to one another at a connecting point forming one or two wedges. Brazing medium fills each wedge and has a mass ML in the wedge. The mass ML of the brazing medium in the wedge and the thickness DF of the metal foils are in a ratio ML/DF of substantially between 8 g/m and 16 g/m.

When attempting to braze thinner metal foils with a material thickness of less than 50 micrometers, in particular when manufacturing a honeycomb body, it was determined that cells simply melt away when the honeycomb body is brought to the brazing temperature. It was also determined that the cells of the honeycomb body were deformed. It is only when an amount of brazing medium applied per connecting point was used in accordance with the rule for adjustment described herein-above with respect to sheet metal thicknesses used heretofore, that the amount of brazing medium defined thereby, and introduced into the wedge, could result on one hand in the metal foil not becoming detached and formation of gaps at the edges being prevented, while on the other hand a durable connection of the brazing points was created.

If a metal foil which is used for a metal foil connection has a metal foil thickness DF of between 0.05 mm and 0.03 mm, the mass of brazing medium ML to be used for the metal foil connection is selected, in an unexpected manner, in an approximately linear dependency with respect to the metal foil thickness DF. The thinner the metal foil thickness DF, the less the mass of the brazing medium ML to be used. An upper limit as well as a lower limit for the mass of brazing medium ML which can still be used can consequently be determined for some metal foil thicknesses DF, and interpolated or extrapolated for other metal foil thicknesses. If a relationship is established between the mass of the brazing medium ML and the metal foil thickness DF, an upper limit in the extent of the ratio of ML/DF=14.6 g/m, with a variation of +5% and −5% has proved advantageous. A ratio of ML/DF=8.7 g/m, with a variation of +5% and −5%, has proved advantageous as a lower limit for the still useable ratio of the mass of brazing medium ML to the metal foil thickness DF. The range to be used for a metal foil thickness DF of less than 0.05 mm to approximately 0.03 mm, can be very accurately determined from these two relationships, given as the upper limit and lower limit. The best results with respect to the durability of the metal foil connection have been produced when a ratio of the mass of the brazing medium ML in the wedge compared to the metal foil thickness DF is approximately ML/DF=11 g/m, with a variation of +15% and −10%.

When using metal foil thicknesses DF of approximately 0.03 mm or less for the metal foil connection, the linear relationship described hereinabove can also be used in order to obtain satisfactory results. However, in an unexpected manner, it has been shown that with metal foil thicknesses DF of less than 0.03 mm, it is not only a linear relationship which exists between the amount of brazing medium that can be used and the metal foil thickness DF. Instead, the gradient of this linearity changes with respect to a range of the metal foil thickness DF of less than 0.05 mm to approximately 0.03 mm. It flattens out somewhat. Preferably, with metal foil thicknesses DF of approximately, or less than, 0.03 mm, an upper limit of the mass of brazing medium ML is selected in dependence upon the metal foil thickness DF along a curve which passes through the following points with coordinates (ML/DF; DF): (14.6 g/m; 0.03 mm), (14.8 g/m; 0.025 mm), (16 g/m; 0.02 mm), (27 g/m; 0.01 mm). A lower limit with a metal foil thickness DF of approximately, or less than, 0.03 mm for the mass of brazing medium ML to be used, in dependence on the metal foil thickness DF, is advantageously selected from a curve which passes along the following points with coordinates (ML/DF; DF): (8.6 g/m; 0.03 mm), (9 g/m; 0.025 mm), (9.2 g/m; 0.02 mm), 16 g/m; 0.01 mm). Extremely durable metal foil connections with a metal foil thickness DF of approximately, or less than, 0.03 mm have been produced when the mass of brazing medium ML in dependence on the metal foil thickness DF is selected from a curve which passes through the following points with coordinates (ML/DF; DF): (11 g/m; 0.03 mm), (11.2 g/m; 0.025 mm), (12 g/m; 0.02 mm), (20 g/m; 0.01 mm). A variation of +5% and −5% is also applicable for these curves.

A preferred area of application for the metal foil connections described hereinabove is honeycomb bodies of sheet metal layers.

With the objects of the invention in view, there is additionally provided a honeycomb body, comprising sheet metal layers formed of at least partly structured metal foils having a thickness of less than 0.04 mm or less than 0.05 mm. The sheet metal layers are at least partly brazed to one another at brazed connecting points. The connecting points each have a metal foil connection with two of the metal foils forming one or two wedges. Brazing medium substantially fills the wedges and has a mass ML. The metal foils have sections contacted by the brazing medium in the wedges. The sections have a mass MF. The mass ML of the brazing medium and the mass MF of the sections of the metal foils contacted by the brazing medium in the wedges are in a given ratio MF/ML of between substantially 4 and substantially 8.

With the objects of the invention in view, there is furthermore provided a honeycomb body, comprising sheet metal layers formed of at least partly structured metal foils having a thickness DF of less than 0.04 mm or less than 0.05 mm. The sheet metal layers are at least partly brazed to one another at brazed connecting points. The connecting points each have a metal foil connection with two of the metal foils forming one or two wedges. Brazing medium fills the wedges and has a mass ML in the wedges. The mass ML of the brazing medium in the wedges and the thickness DF of the metal foils are in a ratio ML/DF of substantially between 8 g/m and 16 g/m.

When using the rules for adjustment set out hereinabove for metal foil connections, it has been shown that the durability of the honeycomb body with respect to mechanical stresses was very much higher as compared to when using amounts of brazing medium which were previously standard. When using the most widely differing metal foil thicknesses, the most advantageous amount of brazing medium could be found in a more rapid and simple manner by taking into account the rule of adjustment between the mass of the brazing medium ML and the metal foil thickness DF. However, not only the durability but also the problems of cell burning, cell deformation, destruction of layers and gap formation at the edges described hereinabove were avoided by observing the rules for adjustment for the metal foil connections.

A further procedure for being able to manufacture a durable metal foil connection is obtained by using a suitable metal foil-brazing medium particle fraction.

Therefore, with the objects of the invention in view, there is furthermore provided a metal foil-brazing medium particle fraction in a brazed connection between first and second metal foils forming a wedge, in particular for manufacturing a brazed connection in a honeycomb body formed of metal foil, comprising a particle size between 0.001 mm or 0.01 mm and 0.2 mm. A maximum diameter of 0.135 mm and a minimum diameter of 0.015 mm are provided for a metal foil thickness of substantially 0.05 mm. A maximum diameter of 0.08 mm and a minimum diameter of 0.02 mm are provided for a metal foil thickness of substantially 0.02 mm. A substantially linear maximum diameter and a substantially linear minimum diameter are provided for a metal foil thickness between substantially 0.05 mm and substantially 0.02 mm. A maximum value of a Gaussian distribution in percent is provided for a respective portion of the diameter disposed substantially centrally between the maximum and the minimum diameters.

In an unexpected manner, a linear relationship has been found between the maximum diameter and minimum diameter of the brazing medium particles of a brazing medium particle fraction for the respective metal foil thicknesses to be connected. Furthermore, very durable metal foil connections for metal foil thicknesses DF of approximately, or less than, 0.05 mm, in particular 0.03 mm or less, have been obtained, in that the maximum value of the Gaussian distribution is not displaced towards a smaller brazing medium particle fraction as the metal foil thicknesses become less, but instead remains disposed in the center within the distribution. An extremely durable metal foil connection resulted when the bell-shape of the Gaussian distribution was retained in the center with decreasing metal foil thicknesses, and when it did not change with metal foil thicknesses which were up to 0.01 mm.

In the case of a maximum diameter of the brazing medium particle fraction, the following rule for adjustment has proved extremely advantageous: the maximum diameter of the brazing medium particle fraction results from the following values:

brazing medium particles with a maximum diameter of 0.125 mm and particularly 0.105 mm, for a thickness of approximately 0.05 mm;

brazing medium particles with a maximum diameter of 0.07 mm and particularly 0.063 mm, for a thickness of approximately 0.02 mm; and a maximum diameter of the brazing medium particles, which is produced in an approximately linear manner from the corresponding values for the thickness of the metal foil of 0.05 mm and 0.02 mm, for a thickness of metal foil which lies therebetween.

In the case of a minimum diameter of the brazing medium particle fraction, the following rule for adjustment proved extremely advantageous: the minimum diameter of the brazing medium particle fraction results from the following values:

brazing medium particles with a minimum diameter of 0.018 mm, in particular 0.023 mm, for a thickness of approximately 0.05 mm;

brazing medium particles with a minimum diameter of 0.03 mm, in particular 0.035 mm, for a thickness of approximately 0.02 mm and a maximum diameter of the brazing medium particles, which is produced in an approximately linear manner from the corresponding values for the thickness of the metal foil of 0.05 mm and 0.02 mm, for a thickness of metal foil which lies therebetween.

In the case of a thickness of the metal foil of 0.03 mm or less, it was determined, in an unexpected manner, that the minimum diameter of the brazing medium particles should not decrease. Rather, the metal foil connections were particularly durable when the minimum diameter was approximately 0.03 mm, in particular 0.035 mm. Brazing medium particles with a diameter less than that did not increase durability. Rather, a deterioration was frequently determined.

With the objects of the invention in view, there is also provided a method for manufacturing a metal foil connection of first and second metal foils using a metal foil-brazing medium particle fraction, in particular for a honeycomb body formed of metal foil, which comprises providing the first and second metal foils with a thickness of less than 0.05 mm; applying glue to the first and second metal foils; subsequently placing the metal foil-brazing medium particle fraction in contact with the first and second metal foils; and brazing the first and second metal foils together at a durable connecting point forming one or two wedges. The metal foil-brazing medium particle fraction is provided with a particle size between 0.001 mm and 0.2 mm; a maximum diameter of 0.135 mm and a minimum diameter of 0.015 mm for a metal foil thickness of substantially 0.05 mm; a maximum diameter of 0.08 mm and a minimum diameter of 0.02 mm for a metal foil thickness of substantially 0.02 mm; a substantially linear maximum diameter and a substantially linear minimum diameter for a metal foil thickness between substantially 0.05 mm and substantially 0.02 mm; and a maximum value of a Gaussian distribution in percent for a respective portion of the diameter disposed substantially centrally between the maximum and the minimum diameters.

With the objects of the invention in view, there is additionally provided a method for manufacturing a metal foil connection of first and second metal foils using metal foil-brazing medium particle fractions. The method comprises providing the first and second metal foils with a thickness of at most 0.03 mm and applying glue to the first and second metal foils. The first and second metal foils are subsequently contacted with a first metal foil-brazing medium particle fraction in a first step. The first and second metal foils are subsequently again contacted with a metal foil-brazing medium particle fraction in a second step. The first and second metal foils are brazed together at a connecting point forming wedges.

In an unexpected manner, a two-step method of application of brazing medium has proved more advantageous with such material thicknesses of the metal foil than a single-step application of brazing medium, despite the high cost. A better durability was obtained, as well as a better control of the amount of brazing medium being introduced, as compared to a purely single-step application of the metal foil-brazing medium particle fraction.

This two-step method is further improved by selecting the first metal foil-brazing medium particle fraction in such a way that it has a greater maximum and a smaller minimum diameter of the brazing medium particles than a metal foil-brazing medium particle fraction used in the second step. Advantageously, in the first step, the first metal foil-brazing medium particle fraction is adjusted as has previously been described hereinabove. The second metal foil-brazing medium particle fraction is again advantageously selected for the second step s in such a way that the maximum diameter of the brazing medium particles is less than 0.07 mm and the minimum diameter of the brazing medium particles is greater than 0.04 mm. When these rules for adjustment are observed, particularly durable metal foil connections are produced. In particular, with the brazing of a honeycomb body, the metal foil connections were produced with an extremely low or no failure rate, directly after the brazing procedure, as well as in subsequent tests.

Other features which are considered as characteristic for the invention are set forth in the appended claims.

Although the invention is illustrated and described herein as embodied in a metal foil connection, a honeycomb body, a metal foil brazing medium particle fraction for metal foils and a method for manufacturing a metal foil connection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
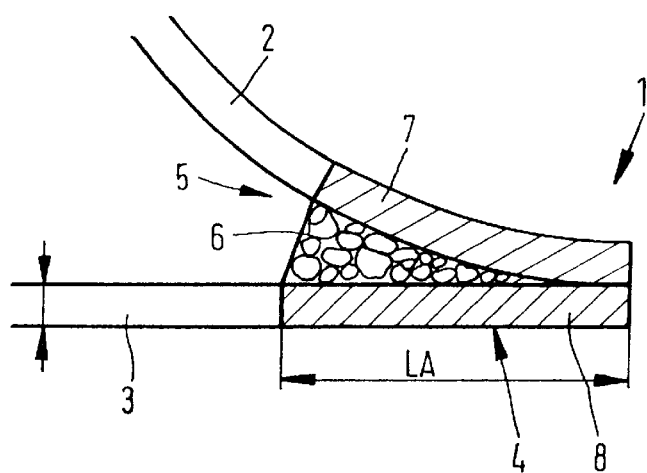
FIG. 1 is a fragmentary, diagrammatic, sectional view of a wedge which is formed from two metal foils.

Referring now to the figures of the drawings in detail and first, particularly, to FIG. 1 thereof, there is seen a metal foil connection 1 of a first metal foil 2 and a second metal foil 3. The metal foils 2, 3 are brazed at a connecting point 4. The connecting point 4 forms an angle or wedge 5 in which the first metal foil 2 and the second metal foil 3 abut one another. Brazing medium 6 is located in the angle or gusset 5. This brazing medium 6 is in the form of a brazing medium particle fraction applied onto a first section 7 of the first metal foil 2 and a second section 8 of the second metal foil 3. This is possible, for example according to a method disclosed in German Patent DE 42 19 145 C1, corresponding to U.S. Pat. No. 5,431,330, which will be very generally referred to below as gluing, and according to the disclosure thereof to which reference will be made. However, the brazing medium 6 can be applied according to different brazing medium application methods described in German Patent DE 42 19 145 C1, corresponding to U.S. Pat. No. 5,431,330, which will also be referred to herein. The first metal foil 2 and the second metal foil 3 each have a metal foil thickness DF of less than 0.05 mm. The surfaces of the two respective metal foils 2, 3 can be prepared in advance for better adhesion of the brazing medium 6, or can be provided with microstructures.

A mass ML of the brazing medium 6 which is located in the wedge 5 is adjusted in such a way that a ratio of the mass ML to a mass MF of the first section 7 of the first metal foil 2 and the second section 8 of the second metal foil 3 is approximately constant regardless of which metal foil thickness DF has been selected. The mass MF of the sections 7, 8 is calculated by addition of the respective individual masses of the first section 7 and the second section 8. These in turn result from respective metal foil thicknesses DF and a length LA of the section which is contacted with brazing medium. The length of the actual abutting together of the two metal foils 2, 3 is also brought into the calculation. This approximately constant ratio is also obtained approximately when the first metal foil 2 has a metal foil thickness DF different from that of the second metal foil 3.

Figure 2:
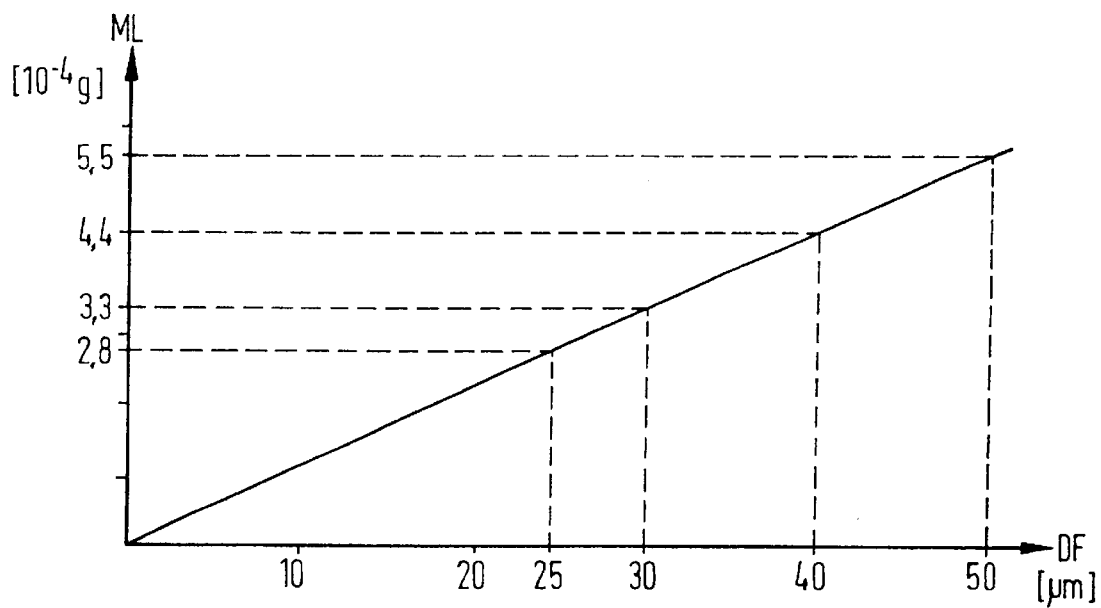
FIG. 2 is a graph showing a relationship in which an amount of brazing medium per connecting point of a metal foil connection is dependent upon a metal foil thickness being used.

FIG. 2 shows a dependency of the brazing medium mass ML of the brazing medium at a connecting point upon the metal foil thickness DF which is selected. Accordingly, the approximately linear dependency already described above results for a metal foil thicknesses of less than 0.05 mm. Not only does the ratio MF/ML=constant, but a gradient of $\Delta ML/\Delta DF$ is also approximately linear for a durable metal foil connection. This makes it possible, when selecting different metal foil thicknesses, to always be able to immediately extrapolate or interpolate the suitable mass of brazing medium ML. In particular, durable metal foil connections in honeycomb bodies have resulted from the following pairs of values (DF [micrometers]; ML [$10^{-4}$ grams]) as is clearly shown in FIG. 2: (50; 5.5), (40; 4.4), (30; 3.3.), (25; 2.8). If the mass of the brazing medium ML for the metal foil thickness DF described lies within these values, naturally with a corresponding upper and lower variation of approximately 10%, depending on the material composition and on the brazing method, the cell burning and cell deformation otherwise occurring with standard application of brazing medium is prevented.

Figure 3:
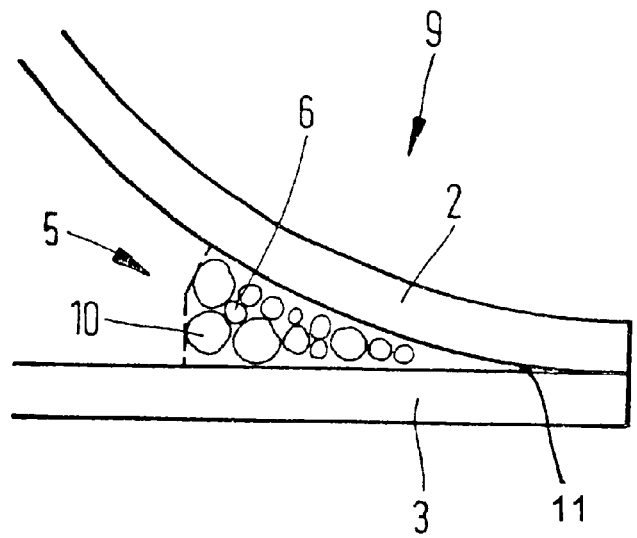
FIG. 3 is a view similar to FIG. 1 showing a wedge filled with a standard brazing medium particle fraction.

FIG. 3 shows a further metal foil connection 9. A standard brazing medium particle fraction 10 according to the prior art is applied in the wedge 5. The wedge 5 is completely closed at its edge 11 because of the use of this standard brazing medium particle fraction 10. This means that between the first metal foil 2 and the second metal foil 3 there is a coherent, completely bonded-together accumulation of brazing medium 6 which takes on the shape of a wedge between the metal foils 2, 3. Another metal foil connection, as is described below and shown FIG. 4 before brazing, differs therefrom.

Figure 4:
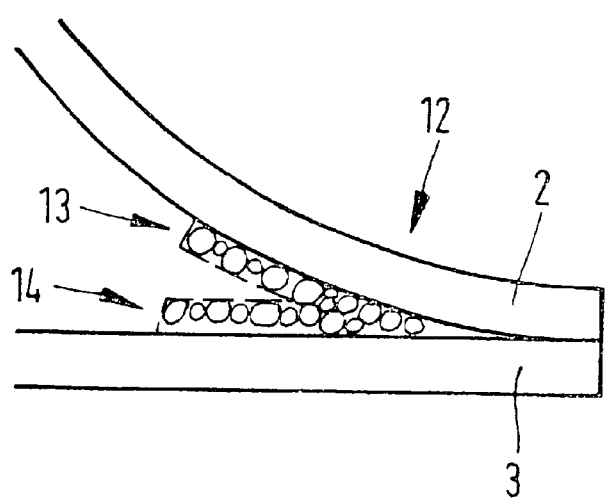
FIG. 4 is another view similar to FIGS. 1 and 3 showing a wedge filled with a modified brazing medium particle fraction.

FIG. 4 shows a different metal foil connection 12 of a first metal foil 2 and a second metal foil 3. The brazing medium 6 is applied to these two metal foils 2, 3 in the form of a first layer 13 on the first metal foil 2 and a second layer 14 on the second metal foil 3. This is performed by using a modified brazing medium particle fraction which is different from the standard brazing medium particle fraction described above in the general description. There is no danger of the brazing medium diffusing through the metal foils 2, 3 or leading to a splitting of the edges during brazing, in particular when using a honeycomb body geometry, because of the lesser metal foil thickness DF, in particular of 0.03 and less, which is at least due to the smaller amount of brazing medium in the metal foil connection 12 as compared to the metal foil connection 9 of FIG. 3.

Figure 5:
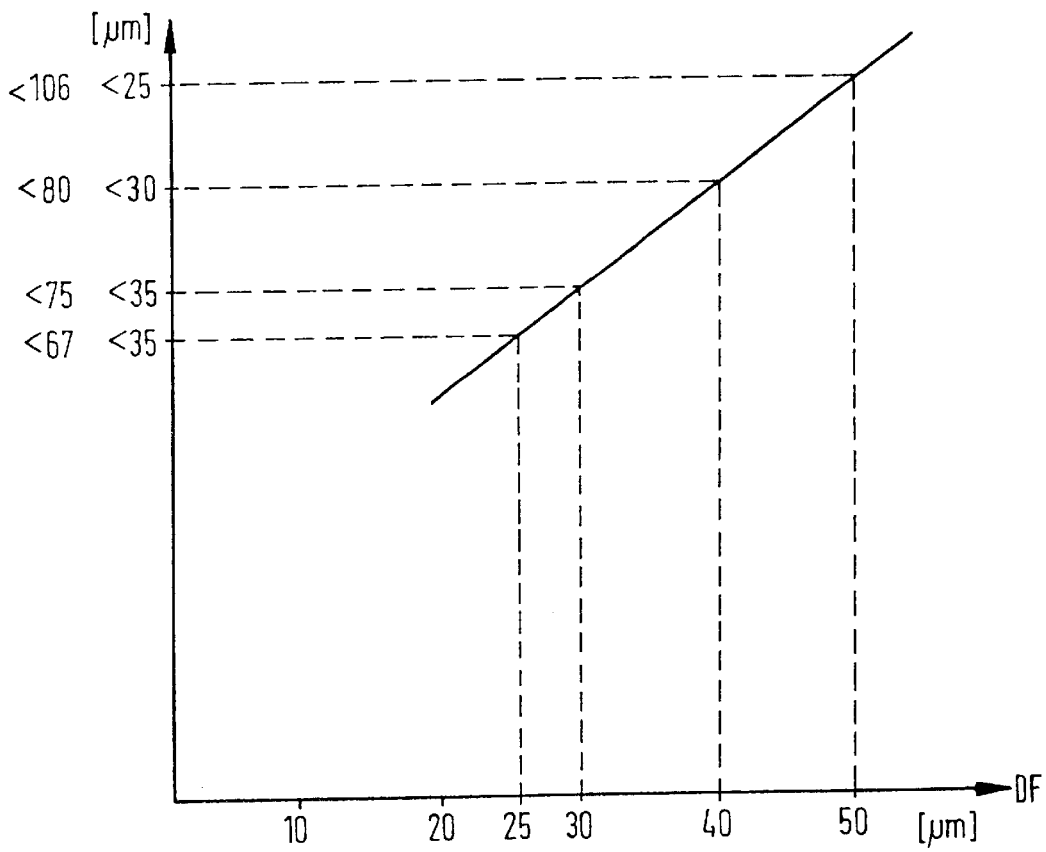
FIG. 5 is a graph showing a dependency between the brazing medium particle fraction being used and the metal foil thickness being used.

FIG. 5 shows a relationship between the selection of a suitable brazing medium particle fraction, shown on the Y axis, and the selected metal foil thickness DF, shown on the X axis. In the case of a metal foil thickness DF of 50 micrometers, a brazing medium particle fraction is used having a smallest brazing medium particle diameter which is larger than 25 micrometers, and a largest brazing medium particle diameter which is less than 106 micrometers. As the metal foil thickness DF decreases, the brazing medium particle fraction is adjusted in such a way that the largest maximum brazing medium particle diameter is continuously reduced, and by contrast the smallest possible brazing medium particle diameter is continuously increased. This produces the result that, from a certain metal foil thickness DF onwards, only brazing medium particle diameters which are larger than the actual metal foil thickness DF are present. The maximum value of the Gaussian distribution thus does not tend downwards, towards ever smaller brazing medium diameters, with decreasing metal foil thicknesses. Rather, it remains in a bell-shape and proceeds only in the edge areas ever more narrowly towards the maximum value located at the center. This relationship is shown in a somewhat different manner in FIG. 5. The brazing medium particle fractions are combined according to a linear equation along the maximum value of the brazing medium particle diameter of the individual brazing medium particle fraction. This rule for adjustment of the brazing medium particle fraction is described below with reference to the following drawings.

Figure 6:
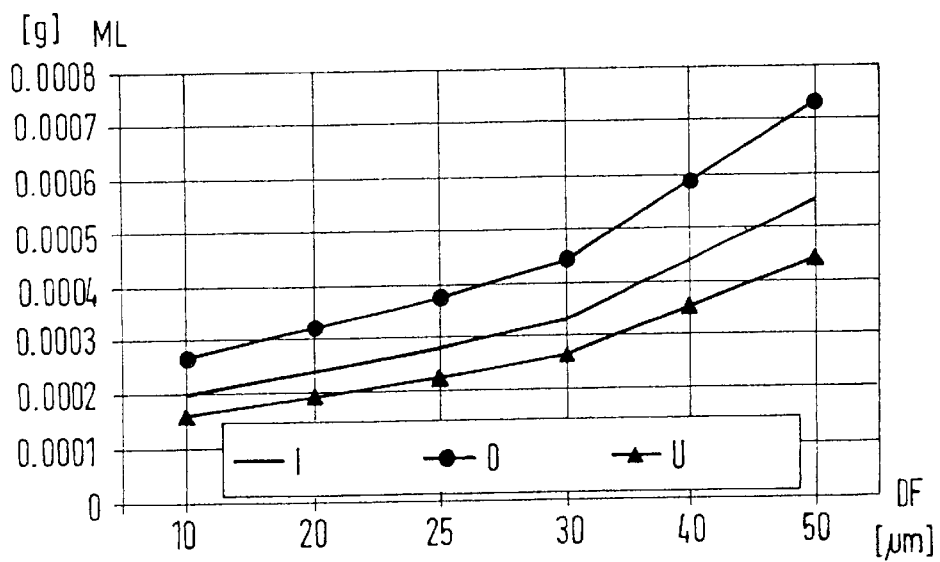
FIG. 6 is a graph showing a relationship in which the amount of brazing medium being used is dependent upon the metal foil thickness.

FIG. 6 shows a rule for adjustment, in order to be able to manufacture durable metal foil connections with metal foil thicknesses of less than 50 micrometers. In particular, it is used when the connections are to be metal foil connections of honeycomb bodies for exhaust gas catalytic converters which are subjected to both thermal and mechanical stresses. On one hand, the mass of the brazing medium ML per metal foil connection is given in grams on the Y axis. This means the mass which should be found in a wedge. On the other hand, the metal foil thickness DF is entered on the X axis. An upper limit O and a lower limit U of the mass ML are shown in the diagram. Particularly good durability of the metal foil connection has resulted when the mass of the brazing medium ML for the respective metal foil thickness DF is selected along a line I. It must be noted in this representation that between the metal foil thickness DF of 20 micrometers and 30 micrometers, an extra metal foil thickness DF of 25 micrometers has been introduced. Due to this, the curve appears more linear, in particular in the range of less than 30 micrometers, than it would be without distortion of the X axis. Despite this, it can be seen from this diagram, that between 30 micrometers and 50 micrometers, there is an approximately linear relationship between the mass ML and the metal foil thickness DF. Below 30 micrometers, the gradient of the curve flattens out somewhat. It is furthermore evident that the bandwidth of the selectable mass range narrows ever further downwards in the form of a funnel towards lesser metal foil thicknesses DF. An approximately ideal value of the selected mass ML along the curve I thus runs nearer to the lower limit U than to the upper limit O. In the case of a more complex body to be brazed such as, for example, a honeycomb body, the rule for adjustment for the brazing medium application method is thus to proceed as far as possible along ideal values according to the curve I. However, care must be taken to ensure that the lower limit is not gone below. Due to the proximity of the curve I to the lower limit U, this risk is more likely than exceeding the upper limit O.

Figures 7, 8:
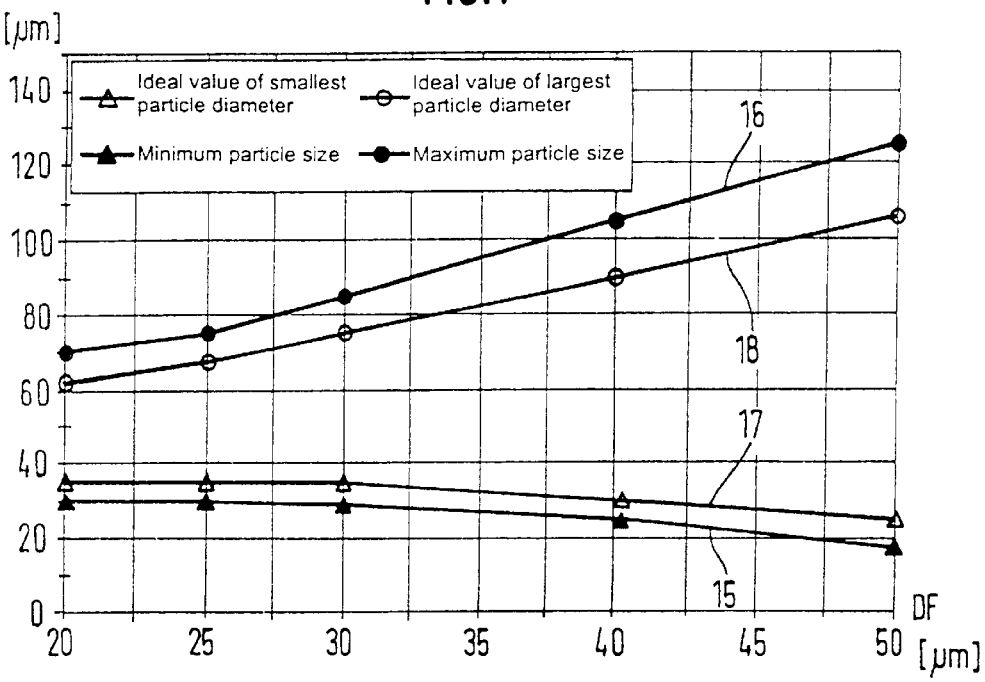
FIG. 7 is a graph showing a relationship in which the amount of brazing medium particle fraction being used is dependent upon the metal foil thickness to be used.
FIG. 8 is a table illustrating a relationship of maximum and minimum ratios of a mass ML of the brazing medium to a metal foil thickness DF.

FIG. 7 shows a bandwidth of the particle sizes, entered on the Y axis in micrometers, in dependence upon the selected metal foil thickness DF, entered on the X axis. This diagram shows in an exemplary manner a bandwidth which has been found for the application of brazing medium to a honeycomb body. A first curve 15 with solid triangles shows the limit of the minimum particle size to be selected. A second curve 16 shows a maximum particle size to be selected, depending on the metal foil thickness DF. Particularly good metal foil connections have been selected for honeycomb bodies when the smallest particle diameter of the brazing medium particle fraction proceeds along a third curve 17 and the largest particle diameter of the brazing medium particle fraction proceeds along a fourth curve 18. Furthermore, it can be seen from the diagram that the upper and lower limits of the brazing medium particle fraction with respect to the particle size, with decreasing metal foil thicknesses DF, approach one another in a tubular manner. An absolute value for the gradient of the second curve 16 and a fourth curve 18 is thus greater than that of the first curve 15 and the third curve 17. In particular, from a metal foil thickness DF of 30 micrometers and less onwards, the absolute gradient of the first curve 15 and the third curve 17 tends towards 0.

FIG. 8 shows the relationship of FIG. 6, wherein in this case, the mass of the brazing medium ML depending on the metal foil thickness DF is represented as a quotient with respect to the metal foil thickness DF. It is evident that the quotient remains approximately constant up to a metal foil thickness DF of 30 micrometers, while at 30 micrometers and less, the quotient ML/DF increases ever further.

Figure 9:
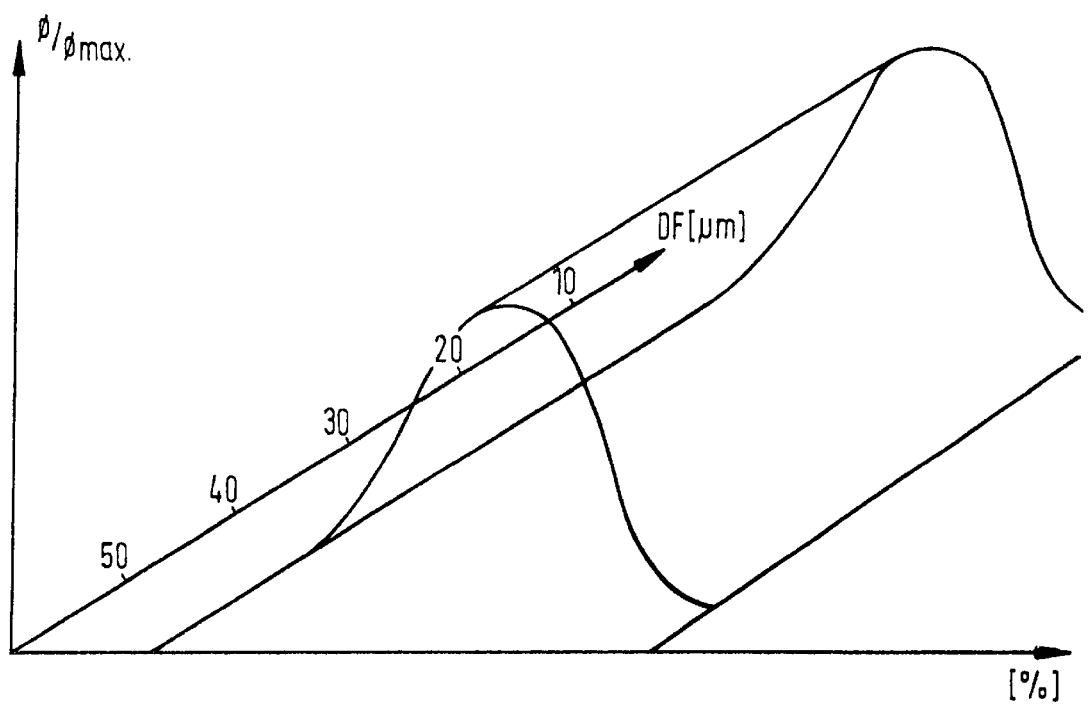
FIG. 9 is a graph showing a Gaussian distribution of a diameter of a brazing medium particle fraction.

FIG. 9 shows a diagrammatic representation of the Gaussian distribution of the brazing medium particle diameter, in dependence upon the metal foil thickness DF. The brazing medium particle diameter is entered up to the maximum brazing medium particle diameter on the Y axis. The percentage distribution is shown on the X axis. It is evident that on one hand, the maximum of the brazing medium particle diameter is approximately central in the bandwidth of the brazing medium particle fraction. It is furthermore evident that the bell-shape does not change in principle as the metal foil thickness DF becomes less, to as small a degree as does the percentage distribution of the brazing medium particle fraction per se.

Figure 10:
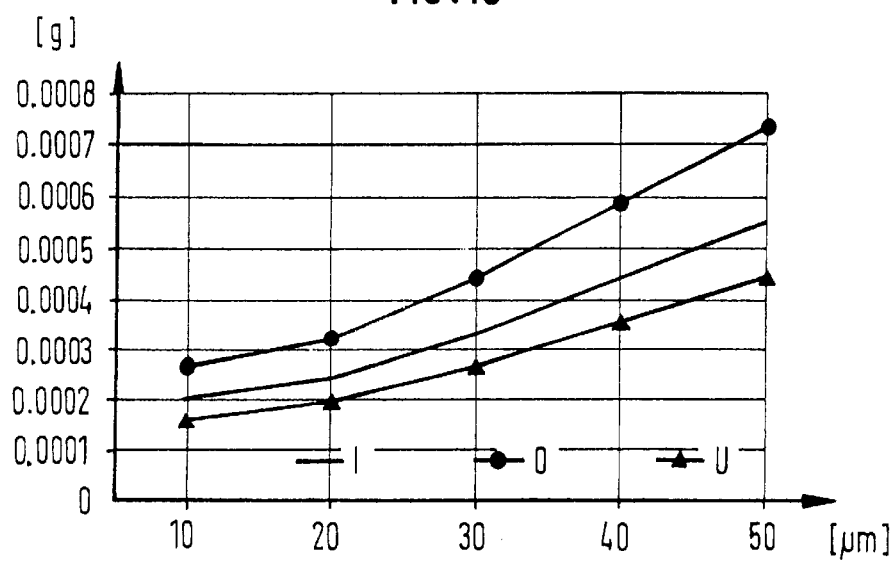
FIG. 10 is a graph showing a further relationship in which the amount of brazing medium being used is dependent upon the metal foil thickness.

FIG. 10 again shows the dependence of the amount of brazing medium used upon the metal foil thickness, as already shown in FIG. 6. In FIG. 10, however, the distortion of the X axis is removed, since the distribution is regular. The linearity of the lower limit U, upper limit O and ideal development I up to approximately 20 micrometers, and then the bending somewhat, is evident from these measured values.

Overall, particularly good durable metal foil connections, in particular in honeycomb bodies, are produced when a metal foil connection with a metal foil-brazing medium particle fraction and/or a method, as described respectively above, was used.

We claim:

1. A method for manufacturing an exhaust gas body made of thin metal foil, comprising:
   a step of forming a honeycomb body in which 10~25 $\mu$m thick corrugated metal foil and flat metal foil are joined by brazed joints using a brazing powder;
   the brazing powder having a particle diameter not greater than 4 times the thickness of the metal foil constituting the honeycomb body.

* * * * *